(12) United States Patent
Phinisee et al.

(10) Patent No.: US 11,460,546 B2
(45) Date of Patent: Oct. 4, 2022

(54) SENSOR-DRAINAGE APPARATUS

(71) Applicant: Ford Global Technologies, LLC, Dearborn, MI (US)

(72) Inventors: Rashaun Phinisee, Ypsilanti, MI (US); Venkatesh Krishnan, Canton, MI (US); Daniel Klevorn, Westland, MI (US); Vijay Gunasekaran, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 178 days.

(21) Appl. No.: 16/813,010

(22) Filed: Mar. 9, 2020

(65) Prior Publication Data

US 2021/0278504 A1    Sep. 9, 2021

(51) Int. Cl.
| | | |
|---|---|---|
| *G01S 7/481* | (2006.01) | |
| *G02B 27/00* | (2006.01) | |
| *G01D 11/30* | (2006.01) | |
| *G01D 11/26* | (2006.01) | |
| *G01D 11/24* | (2006.01) | |
| *G01L 19/14* | (2006.01) | |

(52) U.S. Cl.
CPC ............ *G01S 7/4813* (2013.01); *G01D 11/24* (2013.01); *G01D 11/245* (2013.01); *G01D 11/26* (2013.01); *G01D 11/30* (2013.01); *G01L 19/14* (2013.01); *G02B 27/0006* (2013.01)

(58) Field of Classification Search
CPC ... G01S 7/4813; G02B 27/0006; G01D 11/24; G01D 11/245; G01D 11/30; G01D 11/26; G01L 19/14
USPC .......................................................... 73/431
See application file for complete search history.

(56) References Cited

U.S. PATENT DOCUMENTS

| | | | |
|---|---|---|---|
| 6,789,013 B2 * | 9/2004 | Annett ................ | H01Q 9/0407 343/879 |
| 9,091,577 B2 * | 7/2015 | Speldrich ................ | G01F 1/68 |
| 9,557,736 B1 * | 1/2017 | Silver ................ | G05D 1/0088 |

(Continued)

FOREIGN PATENT DOCUMENTS

| | | | | |
|---|---|---|---|---|
| GB | 2323491 A | | 9/1998 | |
| GB | 2565626 A | * | 2/2019 | ............ B60R 11/04 |

(Continued)

OTHER PUBLICATIONS

Notice of Allowance as issued by the USPTO for related U.S. Appl. No. 16/406,880, filed May 8, 2019.

*Primary Examiner* — Clayton E. La Balle
*Assistant Examiner* — Kevin C Butler
(74) *Attorney, Agent, or Firm* — Frank A. MacKenzie; Bejin Bieneman PLC

(57) ABSTRACT

A sensor apparatus includes a cylindrical sensor window defining an axis oriented substantially vertically, an air nozzle positioned below the sensor window and aimed upward, and a sensor-housing-top cap positioned above the sensor window and including a sensor-housing top and a circumferential cap. The sensor-housing-top cap is a single piece. The circumferential cap includes a topside and an underside. The topside and the underside are disposed radially outward from the sensor window. The underside includes a groove having a cross-section elongated circumferentially around the axis. The cross-section of the groove curves from a lower end upwardly and outwardly to an upper end.

17 Claims, 5 Drawing Sheets

(56) References Cited

U.S. PATENT DOCUMENTS

| | | | | |
|---|---|---|---|---|
| 9,600,768 | B1* | 3/2017 | Ferguson | G06N 5/02 |
| 9,885,526 | B2* | 2/2018 | Maranville | F28F 7/02 |
| 10,150,432 | B2* | 12/2018 | Dry | B60J 10/00 |
| 10,189,450 | B2* | 1/2019 | Rice | B60S 1/52 |
| D902,756 | S* | 11/2020 | Gross | D10/70 |
| 2014/0104426 | A1* | 4/2014 | Boegel | B60R 1/00 348/148 |
| 2014/0156134 | A1* | 6/2014 | Cullinane | B60R 22/48 701/23 |
| 2014/0347819 | A1* | 11/2014 | Ott | H05K 7/20418 361/728 |
| 2015/0336524 | A1* | 11/2015 | Larner | B60R 11/04 293/120 |
| 2016/0096486 | A1* | 4/2016 | Dziurda | B60S 1/54 348/375 |
| 2016/0334790 | A1* | 11/2016 | Rust | B62D 15/0215 |
| 2017/0305242 | A1* | 10/2017 | Gallagher | G07C 5/00 |
| 2018/0015886 | A1* | 1/2018 | Frank | B62D 25/06 |
| 2018/0015908 | A1* | 1/2018 | Rice | B60S 1/56 |
| 2018/0017680 | A1* | 1/2018 | Pennecot | G01S 7/4817 |
| 2018/0122239 | A1* | 5/2018 | Czyz | B60Q 1/245 |
| 2018/0134258 | A1* | 5/2018 | Ekola | B60S 1/52 |
| 2018/0150083 | A1* | 5/2018 | Izadian | G05D 1/0231 |
| 2018/0265049 | A1 | 9/2018 | Schmidt et al. | |
| 2019/0016306 | A1* | 1/2019 | Krishnan | G05D 1/024 |
| 2019/0041234 | A1* | 2/2019 | Ghannam | G01D 11/245 |
| 2019/0212174 | A1* | 7/2019 | Krishnan | G01D 21/02 |
| 2019/0331509 | A1* | 10/2019 | Pizzimenti | H04N 5/22521 |
| 2020/0049535 | A1* | 2/2020 | Krishnan | G01C 21/26 |
| 2020/0149933 | A1* | 5/2020 | Robertson, Jr. | G02B 27/0006 |
| 2020/0189531 | A1* | 6/2020 | Baldovino | B60S 1/026 |
| 2020/0247329 | A1* | 8/2020 | Robertson, Jr. | B60R 11/00 |
| 2020/0346590 | A1* | 11/2020 | Shane | B60R 11/04 |
| 2020/0355807 | A1* | 11/2020 | Phinisee | G01S 7/4813 |
| 2020/0393550 | A1* | 12/2020 | Hamilton | G01S 7/497 |
| 2021/0061237 | A1* | 3/2021 | Krishnan | G01L 17/42 |
| 2021/0103036 | A1* | 4/2021 | Robertson, Jr. | H01L 23/467 |
| 2021/0278504 | A1* | 9/2021 | Phinisee | G01S 7/4813 |

FOREIGN PATENT DOCUMENTS

| | | |
|---|---|---|
| KR | 20170126136 A | 11/2017 |
| WO | 2017119324 A1 | 7/2017 |

\* cited by examiner

SENSOR-DRAINAGE APPARATUS

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
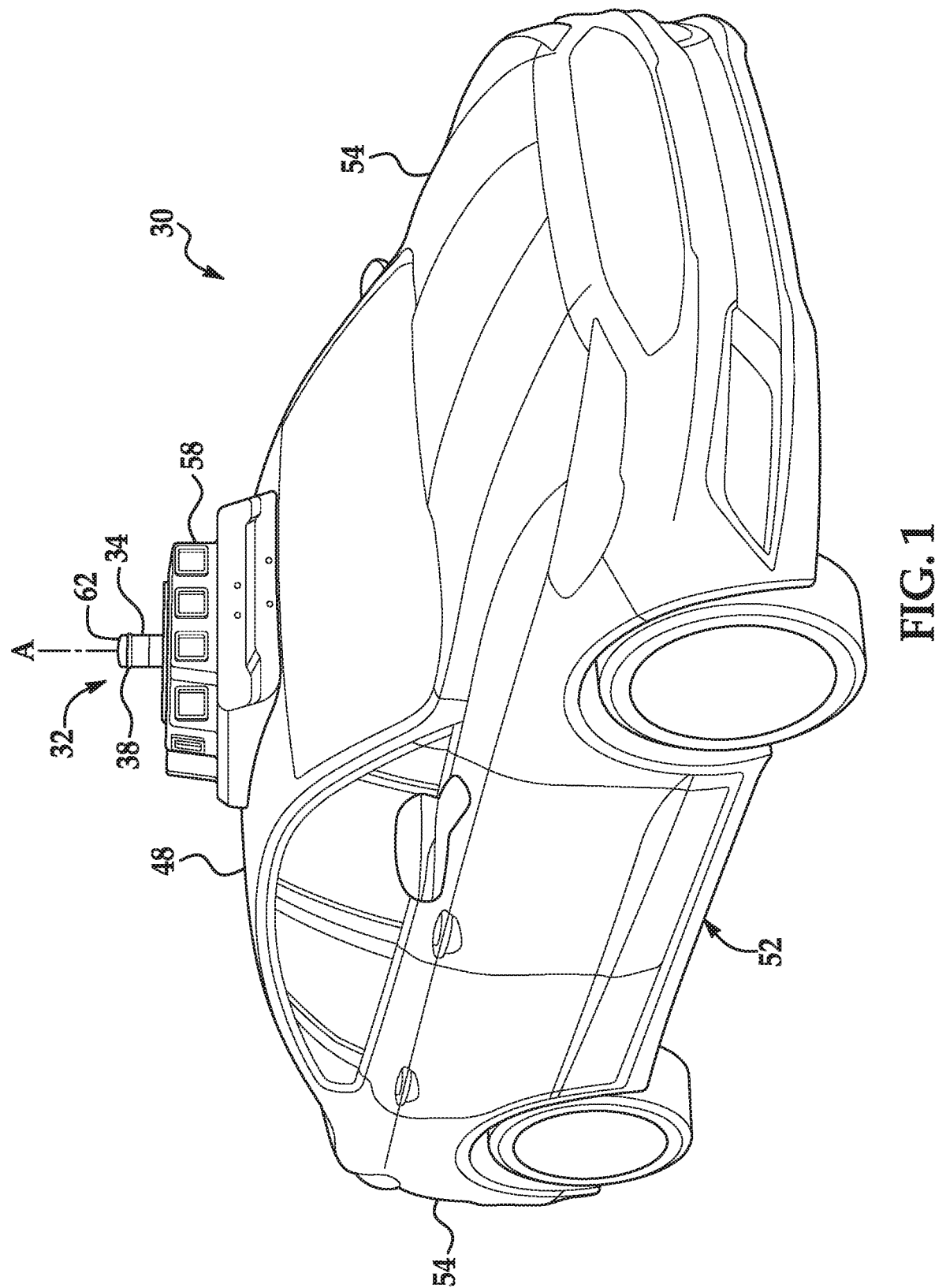
FIG. 1 is a perspective view of an example vehicle including a housing for sensors.

A sensor apparatus includes a cylindrical sensor window defining an axis oriented substantially vertically, an air nozzle positioned below the sensor window and aimed upward, and a sensor-housing-top cap positioned above the sensor window and including a sensor-housing top and a circumferential cap. The sensor-housing-top cap is a single piece. The circumferential cap includes a topside and an underside. The topside and the underside are disposed radially outward from the sensor window. The underside includes a groove having a cross-section elongated circumferentially around the axis. The cross-section of the groove curves from a lower end upwardly and outwardly to an upper end.

The sensor-housing top may include a top surface facing a direction along the axis, and the top surface may include a plurality of fins oriented parallel to each other. The sensor-housing top may include a side surface extending vertically from the topside of the circumferential cap to the top surface of the sensor-housing top.

The groove may have a surface roughness Ra of at most 10 microns.

The sensor-housing-top cap may be aluminum.

The topside of the circumferential cap may include a gutter elongated circumferentially around the axis. The circumferential cap may include a channel extending radially outward relative to the axis from the gutter. The gutter may define a plane at an oblique angle relative to the axis. The channel may extend from a lowest point of the gutter. The groove may be elongated circumferentially around the axis from the channel to the channel.

The gutter may be elongated circumferentially around the axis from the channel to the channel.

The gutter may include a gutter wall at least partially constituting the gutter, and the gutter wall may have a cross-section elongated circumferentially around the axis and extending diagonally outward and upward relative to the axis.

The groove may be elongated circumferentially at least 270° around the axis.

The groove may be a first groove, and the underside of the circumferential cap may include a second groove having a cross-section elongated circumferentially around the axis and extending upward from the first groove. The cross-section of the second groove may curve from a lower end upwardly and outwardly to an upper end. The upper end of the cross-section of the second groove may have a tangent line forming an upward-facing angle with the axis that is greater than 45°.

A diameter of the groove at the lower end of the cross-section of the groove may be at least as great as a diameter of the sensor window.

With reference to the Figures, a sensor apparatus 32 for a vehicle 30 includes a cylindrical sensor window 34 defining an axis A oriented substantially vertically, at least one air nozzle 36 positioned below the sensor window 34 and aimed upward, and a circumferential cap 38 positioned above the sensor window 34 and including a topside 40 and an underside 42. The topside 40 and the underside 42 are disposed radially outward from the sensor window 34. The underside 42 includes a first groove 44 having a cross-section elongated circumferentially around the axis A, and the cross-section of the first groove 44 curves from a lower end 46 upwardly and outwardly to an upper end 48.

The sensor apparatus 32 provides a way to keep liquid off of the sensor window 34. The first groove 44 provides a path for liquid propelled by the air nozzles 36 to fly off of the sensor apparatus 32 instead of gathering, e.g., at or near a top of the sensor apparatus 32. The sensor apparatus 32 can obviate the need for other components for cleaning, e.g., a wiper. The sensor apparatus 32 achieves these benefits with a simple, low-profile design.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate propulsion, brake system, steering, and/or other vehicle systems based at least in part on data received from sensors such as a sensor 50 described below. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 52. The vehicle 30 may be of a unibody construction, in which a frame and the body 52 of the vehicle 30 are a single component. The vehicle 30 may, alternatively, be of a body-on-frame construction, in which the frame supports the body 52 that is a separate component from the frame. The frame and body 52 may be formed of any suitable material, for example, steel, aluminum, etc.

The body 52 includes body panels 54, 56 partially defining an exterior of the vehicle 30. The body panels 54, 56 may present a class-A surface, e.g., a finished surface exposed to view by a customer and free of unaesthetic blemishes and defects. The body panels 54, 56 include, e.g., a roof 56, etc.

Figure 2:
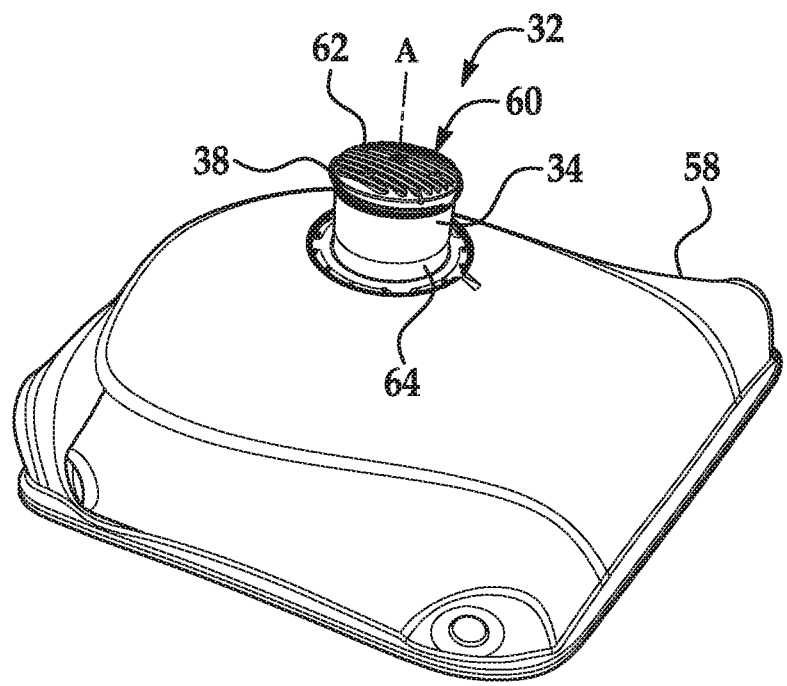
FIG. 2 is a rear perspective view of the housing.

With reference to FIG. 2, a housing 58 for sensors including the sensor 50 is attachable to the vehicle 30, e.g., to one of the body panels 54, 56 of the vehicle 30, e.g., the roof 56. For example, the housing 58 may be shaped to be attachable to the roof 56, e.g., may have a shape matching a contour of the roof 56. The housing 58 may be attached to the roof 56, which can provide the sensors with an unobstructed field of view of an area around the vehicle 30. The housing 58 may be formed of, e.g., plastic or metal.

Figure 3:
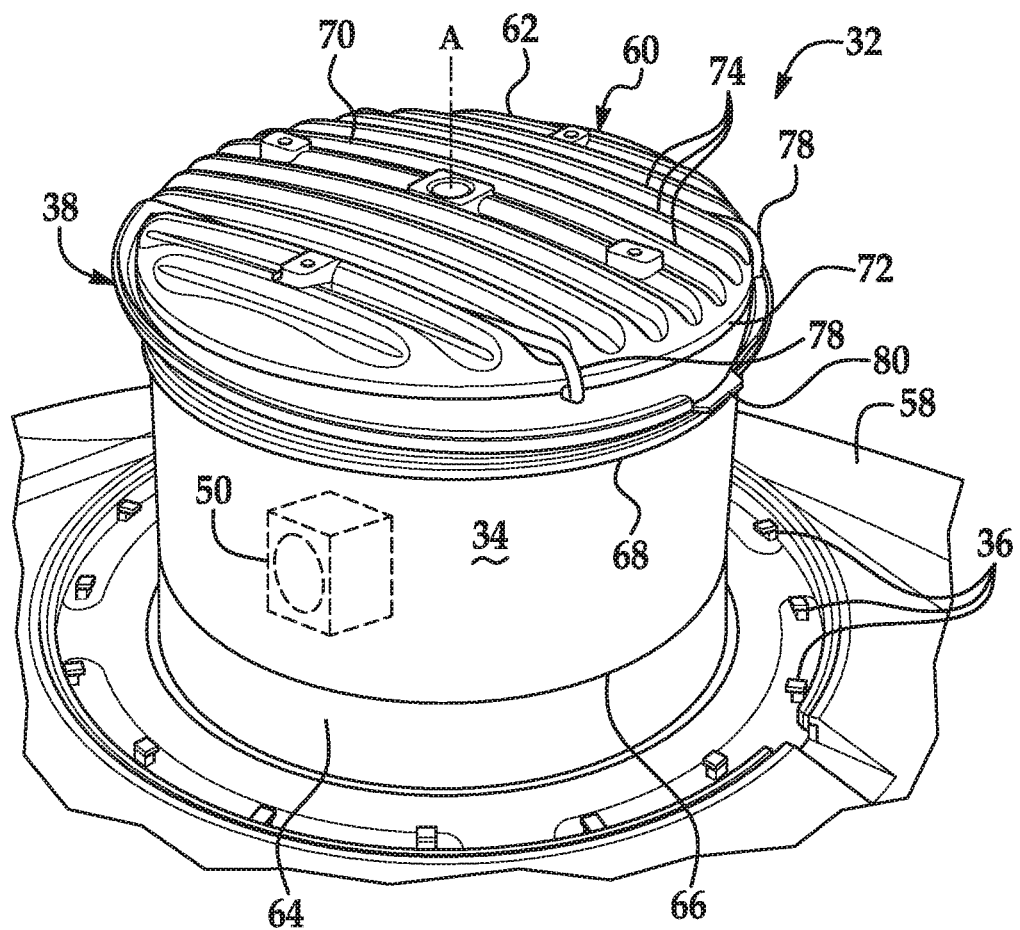
FIG. 3 is a rear perspective view of a sensor apparatus mounted on the housing.

With reference to FIG. 3, a sensor housing 60 is supported by the housing 58. The sensor housing 60 can be disposed on top of the housing 58 at a highest point of the housing 58. The sensor housing 60 has a cylindrical shape and defines the axis A. The sensor housing 60 includes a sensor-housing top 62, the sensor window 34, and a sensor-housing bottom 64. The sensor-housing top 62 is disposed directly above the sensor window 34, and the sensor-housing bottom 64 is disposed directly below the sensor window 34. The sensor-housing top 62 and the sensor-housing bottom 64 are vertically spaced apart by a height of the sensor window 34.

The sensor 50 is disposed inside the sensor housing 60 and is attached to and supported by the housing 58. The sensor 50 may be designed to detect features of the outside world; for example, the sensor 50 may be a radar sensor, a scanning laser range finder, a light detection and ranging (LIDAR) device, or an image processing sensor such as a camera. In particular, the sensor 50 may be a LIDAR device, e.g., a scanning LIDAR device. A LIDAR device detects distances to objects by emitting laser pulses at a particular wavelength and measuring the time of flight for the pulse to travel to the object and back.

The sensor window 34 is cylindrical and defines the axis A, which is oriented substantially vertically. The sensor window 34 extends around the axis A. The sensor window 34 can extend fully around the axis A, i.e., 360°, or partially around the axis A. The sensor window 34 extends along the axis A from a bottom edge 66 to a top edge 68. The bottom edge 66 contacts the sensor-housing bottom 64, and the top edge 68 contacts the sensor-housing top 62. The sensor window 34 has a diameter. The diameter of the sensor window 34 may be the same as the sensor-housing top 62 and/or the sensor-housing bottom 64; in other words, the sensor window 34 may be flush or substantially flush with the sensor-housing top 62 and/or the sensor-housing bottom 64. "Substantially flush" means a seam between the sensor window 34 and the sensor-housing top 62 or sensor-housing bottom 64 does not cause turbulence in air flowing along the sensor window 34. At least some of the sensor window 34 is transparent with respect to whatever medium the sensor 50 is capable of detecting. For example, if the sensor 50 is a LIDAR device, then the sensor window 34 is transparent with respect to visible light at the wavelength generated by the sensor 50.

The sensor-housing top 62 is cylindrical in shape and extends upward from the sensor window 34. The sensor-housing top 62 includes a side surface 72 and a top surface 70. The top surface 70 faces up, i.e., in a vehicle-upward direction, i.e., axially relative to the axis A, and the side surface 72 faces horizontally outward, i.e., radially relative to the axis A. The top edge 68 of the sensor window 34 is spaced from the top surface 70 by a height of the side surface 72.

The top surface 70 includes a plurality of fins 74. The fins 74 extend upward from the rest of the top surface 70, and the fins 74 are oriented parallel to each other. The fins 74 can be oriented along a vehicle-forward direction. The fins 74 are thermally conductive, i.e., have a high thermal conductivity, e.g., a thermal conductivity equal to at least 15 watts per meter-Kelvin (W/(m K)), e.g., greater than 100 W/(m K), at 25° C. For example, the fins 74 may be aluminum.

The sensor apparatus 32 includes a plurality of the air nozzles 36. The air nozzles 36 are mounted on the housing 58. The air nozzles 36 are positioned below the sensor window 34 and are arranged circumferentially around the sensor housing 60. The air nozzles 36 are aimed upward, e.g., aimed in a direction parallel to the axis A. The air nozzles 36 can receive airflow from, e.g., a compressor or blower (not shown).

The circumferential cap 38 is positioned above the sensor window 34 and fixed relative to the sensor window 34. The circumferential cap 38 is attached to the sensor-housing top 62 and extends circumferentially around the sensor-housing top 62.

Figure 4:
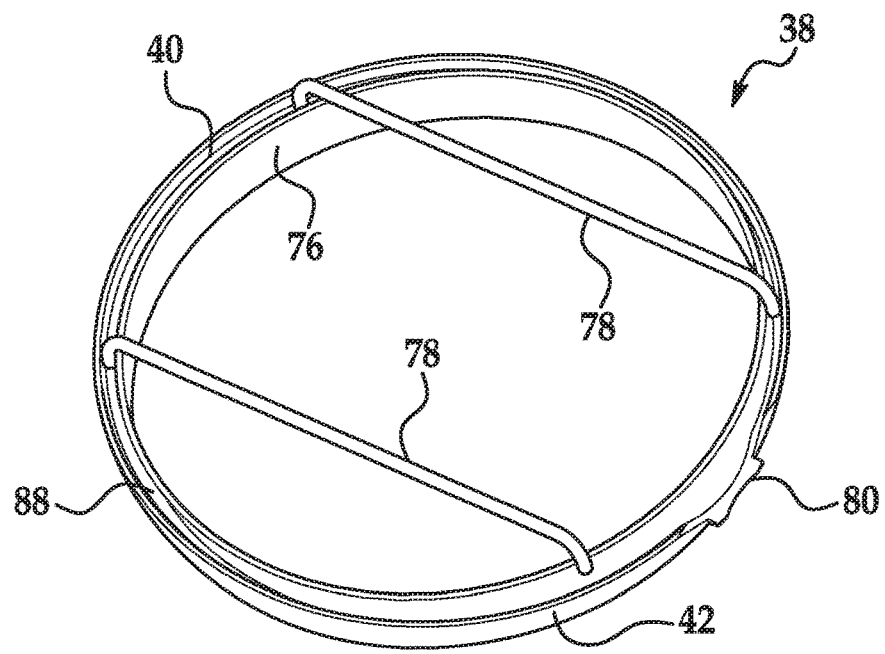
FIG. 4 is a rear perspective view of a circumferential cap of the sensor apparatus.

With reference to FIG. 4, the circumferential cap 38 includes an inner surface 76. The inner surface 76 faces radially inward and extends circumferentially around the axis A. The circumferential cap 38 contacts the sensor-housing top 62 continuously along a circumference via the inner surface 76. The inner surface 76 has a cylindrical shape with a diameter approximately equal to the diameter of the sensor-housing top 62. For example, the diameter of the inner surface 76 when the circumferential cap 38 is unstressed can be slightly smaller than the diameter of the sensor-housing top 62, and the circumferential cap 38 can be attached to the sensor-housing top 62 with a press fit. For another example, the diameter of the inner surface 76 can be equal to or slightly larger than the diameter of the sensor-housing top 62, and the circumferential cap 38 can be attached to the sensor-housing top 62 with adhesive.

The circumferential cap 38 includes at least one, e.g., two, braces 78. Each brace 78 is elongated between two adjacent fins 74 and is parallel to the fins 74. Ends of the braces 78 are connected to the topside 40 of the circumferential cap 38. The braces 78 can support the rest of the circumferential cap 38 and prevent the circumferential cap 38 from sliding down the sensor-housing top 62. The circumferential cap 38 leaves the top surface 70 of the sensor-housing top 62 exposed except for the braces 78.

The circumferential cap 38 is a thermally conductive polymer, i.e., a polymer with high thermal conductivity for a polymer, e.g., a thermal conductivity equal to at least 1.0 watts per meter-Kelvin (W/(m K)), e.g., greater than 5 W/(m K), at 25° C.

Figure 5:
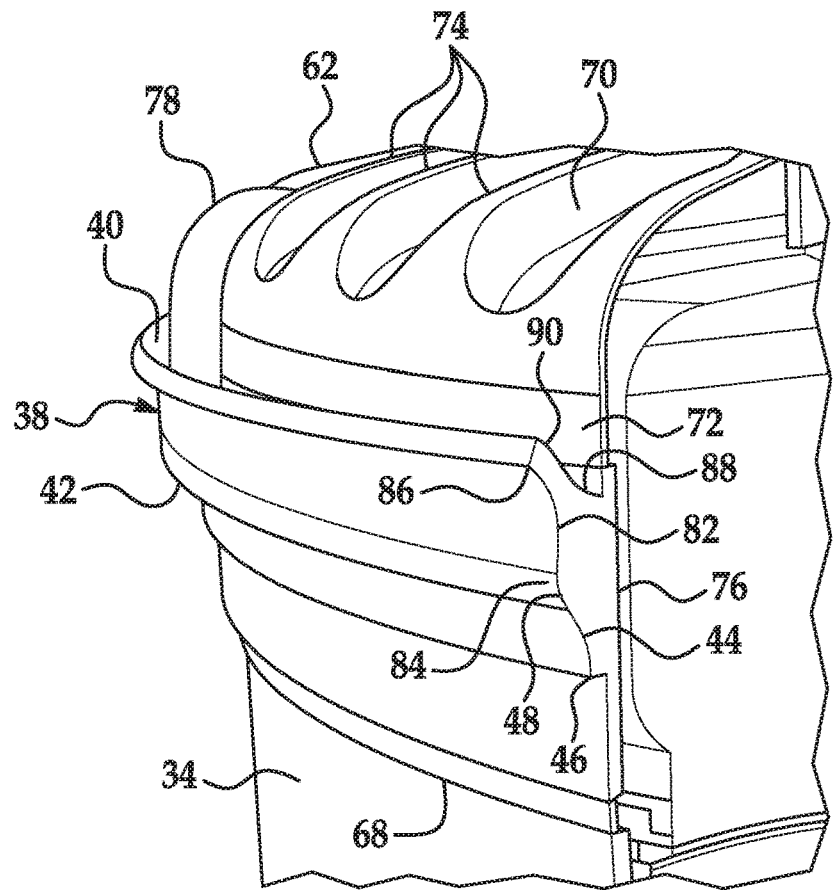
FIG. 5 is a cutaway perspective view of a portion of the sensor apparatus.
Figure 6:
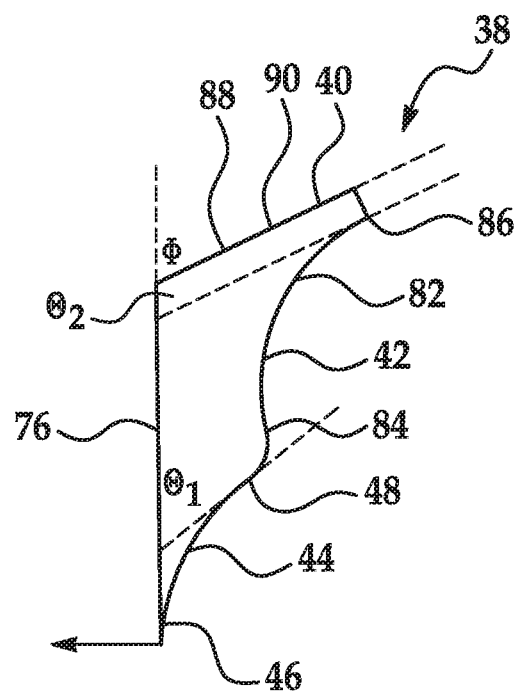
FIG. 6 is a cross-sectional view of the circumferential cap.

With reference to FIGS. 5 and 6, the circumferential cap 38 includes the topside 40 and the underside 42. The circumferential cap 38 has a constant cross-section that is elongated circumferentially around the axis A, e.g., elongated circumferentially more than 270° around the axis A. The circumferential cap 38 includes a channel 80 (described below), and the constant cross-section of the circumferential cap 38 is elongated circumferentially from the channel 80 to the channel 80. The cross-section of the circumferential cap 38 includes the inner surface 76, the topside 40, and the underside 42. The topside 40 is the portion of the cross-section of the circumferential cap 38 that is projectable straight upward, i.e., is visible from a point of view looking straight downward at the circumferential cap 38. The underside 42 is the portion of the cross-section of the circumferential cap 38 that is projectable straight downward, i.e., is visible from a point of view looking straight upward at the circumferential cap 38. The topside 40 and the underside 42 are disposed radially outward from the sensor window 34.

The underside 42 includes the first groove 44. The first groove 44 has a cross-section that is elongated circumferentially around the axis A, e.g., elongated circumferentially more than 270° around the axis A, e.g., elongated circumferentially from the channel 80 to the channel 80. The cross-section of the first groove 44 curves from the lower end 46 upwardly and outwardly to the upper end 48. The lower end 46 has a tangent line oriented parallel to the axis A, and the upper end 48 has a tangent line oriented diagonally outward and upward relative to the axis A. The tangent line of the upper end 48 of the first groove 44 forms an upward-facing angle $\theta_1$ of less than 60°, e.g., approximately 50°, with the axis A, as shown in FIG. 6. The diameter of the first groove 44 at the upper end 48 end of the cross-section is greater than the diameter of the first groove 44 at the lower end 46 of the cross-section. The diameter of the first groove 44 at the lower end 46 of the cross-section is at least as great as the diameter of the sensor window 34.

The underside 42 of the circumferential cap 38 includes a second groove 82 extending upward from the first groove 44. The second groove 82 has a cross-section that is elongated circumferentially around the axis A, e.g., elongated circumferentially more than 270° around the axis A, e.g., elongated circumferentially from the channel 80 to the channel 80. The cross-section of the second groove 82 curves from a lower end 84 upwardly and outwardly to an upper end 86. A tangent line of the upper end 86 of the second groove 82 forms an upward-facing angle $\theta_2$ that is greater than 45°, e.g., approximately 65°, with the axis A, as shown in FIG. 6. The diameter of the second groove 82 at the upper end 86 of the cross-section is greater than the diameter of the second groove 82 at the lower end 84 of the cross-section. The diameter of the second groove 82 at the lower end 84 of the cross-section is equal to the diameter of the first groove 44 at the upper end 48 of the cross-section of the first groove 44.

The topside 40 of the circumferential cap 38 includes a gutter 88. The gutter 88 is elongated circumferentially around the axis A, e.g., elongated circumferentially more than 270° around the axis A, e.g., elongated circumferentially from the channel 80 to the channel 80. The gutter 88 includes a gutter wall 90 at least partially constituting the gutter 88, and the gutter wall 90 has a cross-section elongated circumferentially around the axis A and extending diagonally outward and upward relative to the axis A. The gutter wall 90 forms an upward-facing angle $\varphi$ that is greater than 45°, e.g., approximately 65°, with the axis A, as shown in FIG. 6.

Figure 7:
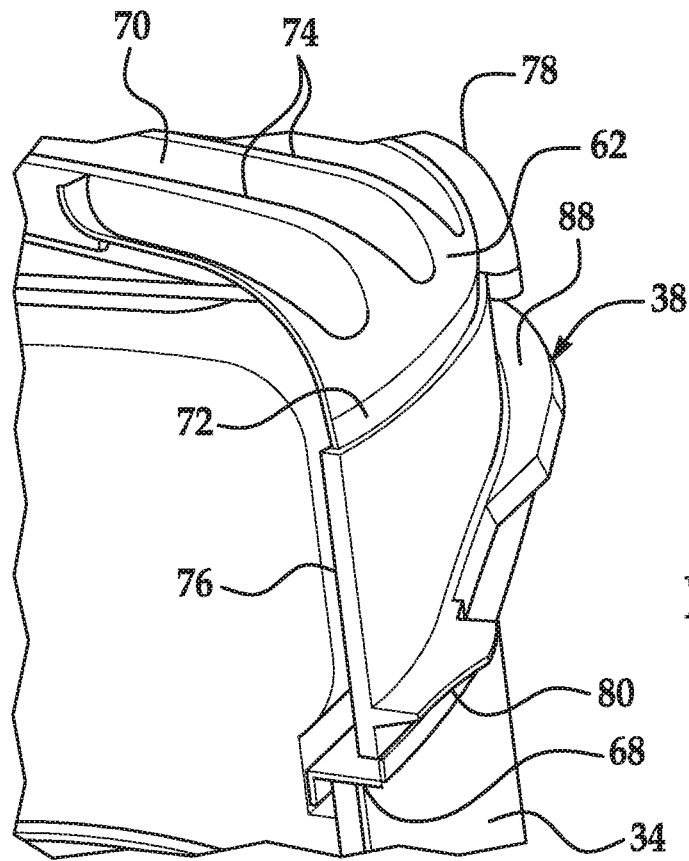
FIG. 7 is a cutaway perspective view of a portion of the sensor apparatus.

With reference to FIG. 7, the circumferential cap 38 includes the channel 80. The extends radially outward relative to the axis A from the gutter 88. The channel 80 is lower than an upper height of the gutter 88, i.e., lower than a top of the gutter wall 90. The channel 80 can be positioned at a rearwardmost position on the circumferential cap 38, as shown in FIG. 3.

In operation, liquid may land on the sensor window 34. The liquid may be water, e.g., precipitation such as rain, or may be washer fluid from, e.g., a cleaning system of the vehicle 30. The airflow from the air nozzles 36 pushes the liquid upward to the first groove 44. The shape of the cross-section of the first groove 44 causes the upward-moving liquid to fly off of the sensor apparatus 32; in other words, the momentum of the liquid causes the liquid to slide from the lower end 46 to the upper end 48 of the first groove 44 and then off of the upper end 48 at the angle of the upper end 48. Liquid that lands on the top surface 70 of the sensor-housing top 62 is caught by the gutter 88 as the liquid flows off of the top surface 70, and the gutter 88 carries the liquid to the channel 80, where the liquid exits rearward from the sensor apparatus 32 without contacting the sensor window 34.

In operation, the sensor 50 generates heat. Much of the heat generated by the sensor 50 is transmitted to the sensor-housing top 62. The sensor-housing top 62 radiates heat outward through the fins 74 and transmits heat to the circumferential cap 38. The circumferential cap 38 can transfer heat to liquid flowing through the gutter 88, which allows the heat to exit the sensor apparatus 32 along with the liquid. The flowing liquid increases the rate of heat transfer through the circumferential cap 38 compared with not having a replenishing supply of liquid to transfer heat to.

Figure 8:
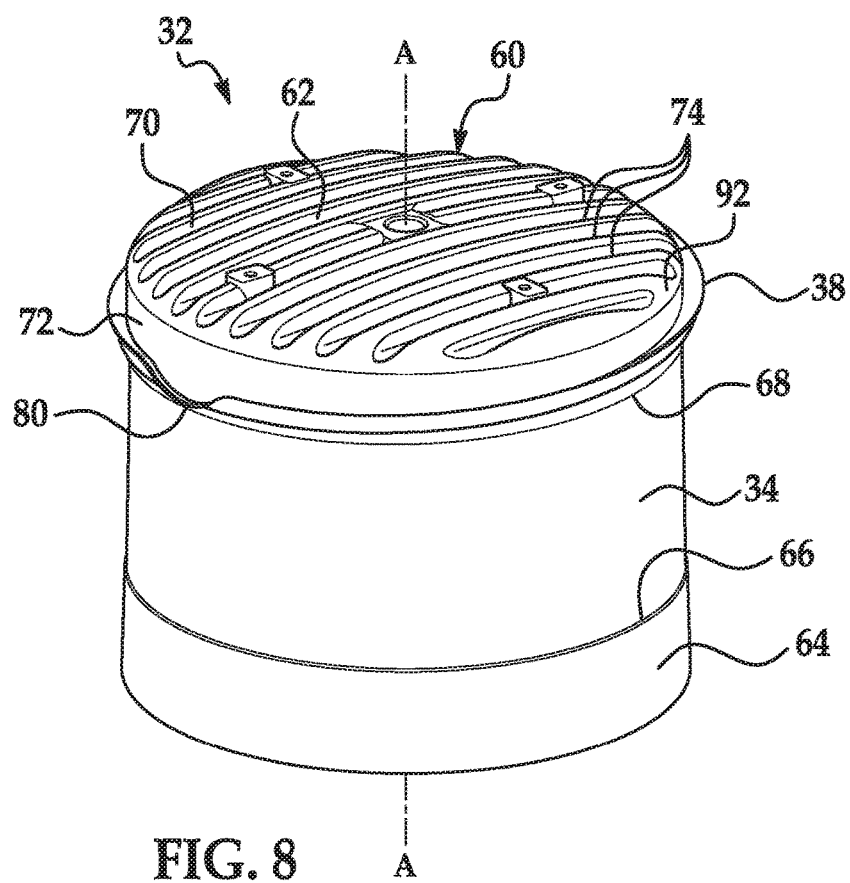
FIG. 8 is a perspective view of another example of the sensor apparatus.
Figure 9:
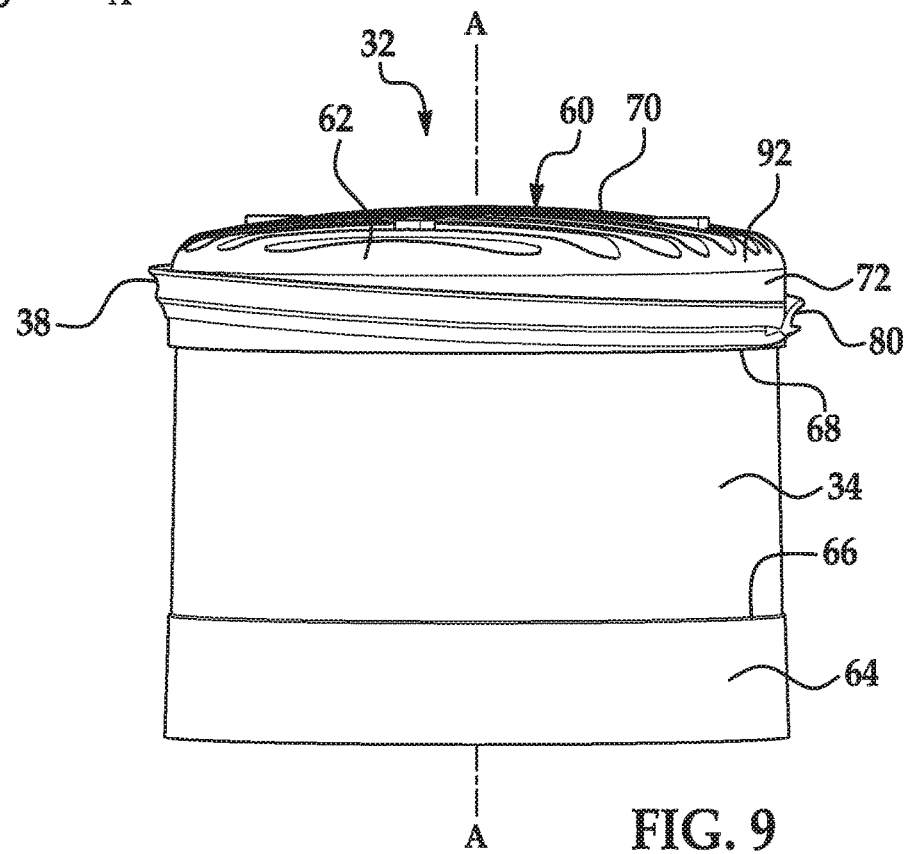
FIG. 9 is a side view of the sensor apparatus of FIG. 8.

With reference to FIGS. 8 and 9, in another example of the sensor apparatus 32, the sensor apparatus 32 includes a sensor-housing-top cap 92. The sensor-housing-top cap 92 is positioned above the sensor window 34 and contacts the sensor window 34 at the top edge 68. The sensor-housing-top cap 92 includes the sensor-housing top 62 and the circumferential cap 38.

The sensor-housing-top cap 92 is a single piece, i.e., made of a single, uniform piece of material with no seams, joints, fasteners, or adhesives holding it together. For example, the sensor-housing-top cap 92 is aluminum, which has a sufficiently high thermal conductivity and can be easily shaped. For example, the sensor-housing-top cap 92 can be formed by casting and then machining to the shape shown in FIGS. 8 and 9. Making the sensor-housing-top cap 92 a single piece makes manufacturing and assembly simpler, makes meeting tolerances easier, and provides a smoother path for liquid traveling upward from the sensor window 34 to the circumferential cap 38.

The sensor-housing top 62 is cylindrical in shape and includes the side surface 72 and the top surface 70. The top surface 70 faces up, i.e., in a vehicle-upward direction, i.e., in a direction along the axis A, i.e., axially relative to the axis A. The side surface 72 faces horizontally outward, i.e., radially relative to the axis A. In this example of the sensor apparatus 32, the side surface 72 extends vertically from the topside 40 of the circumferential cap 38 to the top surface 70 of the sensor-housing top 62, rather than extending from the sensor window 34 as described above.

In this example of the sensor apparatus 32, the circumferential cap 38 lacks the inner surface 76 and is unitary with the sensor-housing top 62 rather than being attached to the sensor-housing top 62 by, e.g., a press fit. The circumferential cap 38 includes the topside 40 and the underside 42 as described above. The circumferential cap 38 has a constant cross-section that is elongated circumferentially around the axis A, e.g., from the channel 80 to the channel 80. The cross-section of the circumferential cap 38 is elongated following a path that is in a plane that intersects the axis A at an oblique angle, i.e., an angle neither orthogonal nor parallel to the axis A. The path followed by the cross-section of the circumferential cap 38 is elliptical. The gutter 88, the first groove 44, and the second groove 82 all follow the path in the plane and thus define the plane or define a parallel plane forming the same oblique angle relative to the axis. The channel 80 extends from a lowest point of the cross-section, i.e., a lowest point of the gutter 88, the first groove 44, and the second groove 82. The tilt of the gutter 88 helps liquid that is in the gutter 88 exit via the channel 80.

The underside 42, including the first groove 44 and the second groove 82, have a surface roughness Ra of at most 10 microns. The surface roughness Ra is the arithmetical mean of the absolute values of deviations from a centerline of a surface profile of the surface of interest, i.e., Ra= $(\Sigma_{i=1}^{n}|y_i|)/n$, in which i is an index of measurements, n is the number of measurements, and $y_i$ is the deviation of measurement i from the centerline of the surface. The low roughness of the underside 42 helps liquid that is traveling upward from the sensor window 34 to fly off of the underside 42 instead of gathering at the bottom of the circumferential cap 38. For example, the underside 42 can be machined aluminum.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor apparatus comprising:
   a cylindrical sensor window defining an axis oriented substantially vertically;
   an air nozzle positioned below the sensor window and aimed upward; and
   a sensor-housing-top cap positioned above the sensor window and including a sensor-housing top and a circumferential cap;
   wherein the sensor-housing-top cap is a single piece;
   the circumferential cap includes a topside and an underside, the topside and the underside disposed radially outward from the sensor window, the underside including a groove having a cross-section elongated circumferentially around the axis, the cross-section of the groove curving from a lower end upwardly and outwardly to an upper end.

2. The sensor apparatus of claim 1, wherein the sensor-housing top includes a top surface facing a direction along the axis, and the top surface includes a plurality of fins oriented parallel to each other.

3. The sensor apparatus of claim 2, wherein the sensor-housing top includes a side surface extending vertically from the topside of the circumferential cap to the top surface of the sensor-housing top.

4. The sensor apparatus of claim 1, wherein the groove has a surface roughness Ra of at most 10 microns.

5. The sensor apparatus of claim 1, wherein the sensor-housing-top cap is aluminum.

6. The sensor apparatus of claim 1, wherein the topside of the circumferential cap includes a gutter elongated circumferentially around the axis.

7. The sensor apparatus of claim 6, wherein the circumferential cap includes a channel extending radially outward relative to the axis from the gutter.

8. The sensor apparatus of claim 7, wherein the gutter defines a plane at an oblique angle relative to the axis.

9. The sensor apparatus of claim 8, wherein the channel extends from a lowest point of the gutter.

10. The sensor apparatus of claim 9, wherein the groove is elongated circumferentially around the axis from the channel to the channel.

11. The sensor apparatus of claim 9, wherein the gutter is elongated circumferentially around the axis from the channel to the channel.

12. The sensor apparatus of claim 6, wherein the gutter includes a gutter wall at least partially constituting the gutter, and the gutter wall has a cross-section elongated circumferentially around the axis and extending diagonally outward and upward relative to the axis.

13. The sensor apparatus of claim 1, wherein the groove is elongated circumferentially at least 270° around the axis.

14. The sensor apparatus of claim 1, wherein the groove is a first groove, the underside of the circumferential cap includes a second groove having a cross-section elongated circumferentially around the axis and extending upward from the first groove.

15. The sensor apparatus of claim 14, wherein the cross-section of the second groove curves from a lower end upwardly and outwardly to an upper end.

16. The sensor apparatus of claim 15, wherein the upper end of the cross-section of the second groove has a tangent line forming an upward-facing angle with the axis that is greater than 45°.

17. The sensor apparatus of claim 1, wherein a diameter of the groove at the lower end of the cross-section of the groove is at least as great as a diameter of the sensor window.

\* \* \* \* \*